US011862371B2

(12) United States Patent
Chiku et al.

(10) Patent No.: US 11,862,371 B2
(45) Date of Patent: Jan. 2, 2024

(54) MAGNETIC STRUCTURAL BODY

(71) Applicant: Murata Manufacturing Co., Ltd., Kyoto-fu (JP)

(72) Inventors: Shinichiro Chiku, Nagaokakyo (JP); Takenori Sekijima, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 734 days.

(21) Appl. No.: 16/989,700

(22) Filed: Aug. 10, 2020

(65) Prior Publication Data

US 2020/0373062 A1 Nov. 26, 2020

Related U.S. Application Data

(63) Continuation of application No. PCT/JP2019/006179, filed on Feb. 13, 2019.

(30) Foreign Application Priority Data

Feb. 13, 2018 (JP) ................................ 2018-023438

(51) Int. Cl.
*H01F 1/14* (2006.01)
*H01F 1/147* (2006.01)
(Continued)

(52) U.S. Cl.
CPC ............ *H01F 1/143* (2013.01); *B22F 1/0547* (2022.01); *B22F 1/065* (2022.01); *B22F 1/08* (2022.01);
(Continued)

(58) Field of Classification Search
CPC .. H01F 1/143; H01F 1/14741; H01F 1/15358; H01F 1/22; H01F 1/153;
(Continued)

(56) References Cited

U.S. PATENT DOCUMENTS

2009/0053512 A1 2/2009 Pyun et al.
2012/0038532 A1 2/2012 Yonetsu et al.
2015/0325347 A1 11/2015 Rowe et al.

FOREIGN PATENT DOCUMENTS

JP 2003-055703 A 2/2003
JP 2004-149897 * 5/2004
(Continued)

OTHER PUBLICATIONS

Translation for JP 2005-325374, Nov. 25, 2005.*
(Continued)

*Primary Examiner* — C Melissa Koslow
(74) *Attorney, Agent, or Firm* — Studebaker & Brackett PC

(57) ABSTRACT

A magnetic structural body contains core-shell structure particles each including a core section and a shell section covering the surface of the core section. The core section is made of an alloy containing a first metal and a second metal. The shell section is made of an alloy which contains the first metal and the second metal and which has a first metal-to-second metal content ratio different from that of the core section. The first metal is a magnetic metal and has a standard redox potential higher than that of the second metal. The neighboring core-shell structure particles are linearly linked to each other.

20 Claims, 7 Drawing Sheets

(51) Int. Cl.

| | |
|---|---|
| ***H01F 1/153*** | (2006.01) |
| ***H01F 27/255*** | (2006.01) |
| ***B22F 1/08*** | (2022.01) |
| ***B22F 1/054*** | (2022.01) |
| ***B22F 1/065*** | (2022.01) |
| ***B22F 1/17*** | (2022.01) |

(52) U.S. Cl.
CPC ............ *B22F 1/17* (2022.01); *H01F 1/14741* (2013.01); *H01F 1/153* (2013.01); *H01F 27/255* (2013.01)

(58) Field of Classification Search
CPC .... B22F 1/065; B22F 1/08; B22F 1/17; B22F 1/148; B22F 5/12
See application file for complete search history.

(56) References Cited

FOREIGN PATENT DOCUMENTS

| | | | |
|---|---|---|---|
| JP | 2005-325374 | * | 11/2005 |
| JP | 2005-325374 | A | 11/2005 |
| JP | 2006-186317 | A | 7/2006 |
| JP | 2007-152548 | A | 6/2007 |
| JP | 2011-058021 | A | 3/2011 |
| JP | 2011-256106 | A | 12/2011 |
| JP | 2013-236021 | A | 11/2013 |
| JP | 2015-163394 | A | 9/2015 |
| JP | 2016-167386 | A | 9/2016 |
| WO | WO 2005/105347 | * | 11/2005 |
| WO | 2016/085411 | A1 | 6/2016 |

OTHER PUBLICATIONS

International Search Report issued in PCT/JP2019/006179; dated May 7, 2019.

International Preliminary Report on Patentability and Written Opinion issued in PCT/JP2019/006179; dated Aug. 18, 2020.

G. Viau et al., Preparation and microwave characterization of spherical and monodisperse Co20Ni80 particles, "Journal of Applied Physics", Nov. 15, 1994, vol. 76, No. 10, pp. 6570-6572.

M. Kawamori et al., Iron Alloying Effect on Formation of Cobalt Nanoparticles and Nanowires via Electroless Deposition under a Magnetic Field, "Journal of The Electrochemical Society", 2014, vol. 161, No. 1, pp. D59-D66.

M. Kawamori et al., Nickel Alloying Effect on Formation of Cobalt Nanoparticles and Nanowires via Electroless Deposition under a Magnetic Field, "Journal of The Electrochemical Society", 2012, vol. 159, No. 2, pp. E37-E44.

M. Krajewski et al., Structural and magnetic properties of iron nanowires and iron nanoparticles fabricated through a reduction reaction, "Beilstein Journal of Nanotechnology", 2015, vol. 6, pp. 1652-1660.

H. Kura et al., Effect of induced uniaxial magnetic anisotropy on ferromagnetic resonance frequency of Fe—Co alloy nanoparticle/polystyrene nanocomposite, "Scripta Materialia", 2014, vol. 76, pp. 65-68.

The extended European search report issued by the European Patent Office dated Nov. 11, 2021, which corresponds to European U.S. Appl. No. 16/989,700-1103 and is related to U.S. Appl. No. 16/989,700.

B. Jeyadevan et al., Solution Synthesis of Nanocrystalline Core-shell Structured NiCo Particles, "Journal of the Japan Society of Powder and Powder Metallurgy", Feb. 2003, vol. 50, No. 2, pp. 107-113.

* cited by examiner

MAGNETIC STRUCTURAL BODY

CROSS-REFERENCE TO RELATED APPLICATIONS

This application claims benefit of priority to International Patent Application No. PCT/JP2019/006179, filed Feb. 13, 2019, and to Japanese Patent Application No. 2018-023438, filed Feb. 13, 2018, the entire contents of each are incorporated herein by reference.

BACKGROUND

Technical Field

The present disclosure relates to a magnetic structural body.

Background Art

Magnetic materials, capable of achieving higher magnetic permeability, for use in coil components such as inductors are being developed.

International Publication No. 2016/085411 describes a method for preparing a magnetic chain structure. The method includes (a) preparing a plurality of magnetic particles, (b) forming a reaction mixture by dispersing the magnetic particles in a solution containing a dopamine-based material, (c) arraying the magnetic particles in the reaction mixture by applying a magnetic field to the reaction mixture, and (d) obtaining the magnetic chain structure by polymerizing the dopamine-based material on the arrayed magnetic particles.

Also, a publication by G. Viau et al., entitled "Journal of Applied Physics", 1994, Vol. 76, No. 10, pp. 6570-6572, describes spherical, monodisperse Co20Ni80 particles in the range of a micrometer size and a sub-micrometer size. A publication by B. Jeyadevan et al., entitled "Powder and Powder Metallurgy", 2003, Vol. 50, No. 2, pp. 107-113, describes nanometer-sized NiCo particles with a core-shell structure by an improved polyol method.

A publication by M. Kawamori et al., entitled "Journal of The Electrochemical Society", 2014, Vol. 161, No. 1, pp. D59-D66, describes Fe—Co nanowires. A publication by M. Kawamori et al., entitled "Journal of The Electrochemical Society", 2012, Vol. 159, No. 2, pp. E37-E44, describes Co—Ni nanowires. A publication by M. Krajewski et al., entitled "Beilstein Journal of Nanotechnology", 2015, Vol. 6, pp. 1652-1660, describes iron nanowires. A publication by H. Kura et al., entitled "*Scripta* Materialia", 2014, Vol. 76, pp. 65-68, describes a Fe—Co alloy nanoparticle/polystyrene nano-composite.

SUMMARY

Inductors are required to carry a large current in association with recent electronic devices and an increase in current. Therefore, magnetic structural bodies, having a structure with higher mechanical strength, suitable for large-current applications are required.

Accordingly, the present disclosure provides a magnetic structural body having a structure with higher mechanical strength.

The inventors have found that a magnetic structural body having a structure with higher mechanical strength can be obtained by adopting a core-shell structure having a specific alloy composition and shape, leading to the completion of the present disclosure.

A summary of the present disclosure provides a magnetic structural body containing core-shell structure particles each including a core section and a shell section covering the surface of the core section. The core section is made of an alloy containing a first metal and a second metal. The shell section is made of an alloy which contains the first metal and the second metal and which has a first metal-to-second metal content ratio different from that of the core section. The first metal is a magnetic metal and has a standard redox potential higher than that of the second metal. The neighboring core-shell structure particles are linearly linked to each other.

A magnetic structural body according to the present disclosure has the above feature and therefore has a structure with higher mechanical strength.

DETAILED DESCRIPTION

A magnetic structural body according to an embodiment of the present disclosure is described below in detail with reference to drawings. Incidentally, the magnetic structural body according to the present disclosure is not limited to an embodiment described below or an illustrated configuration.

Figure 1A:
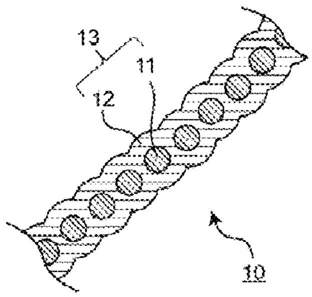
FIGS. 1A to 1C are schematic views showing the structure of a magnetic structural body according to an embodiment of the present disclosure.
Figure 1B:
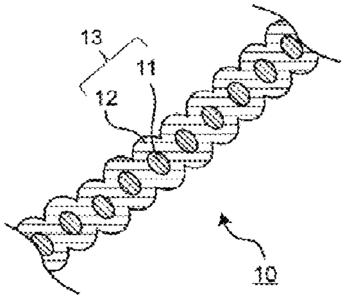
Figure 1C:
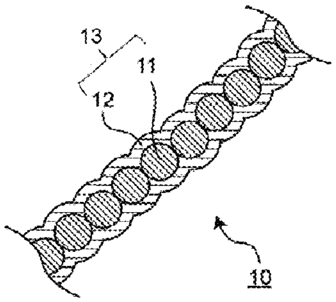

The structure of the magnetic structural body according to an embodiment of the present disclosure is schematically shown in FIGS. 1A to 1C. The magnetic structural body 10 according to this embodiment contains core-shell structure particles 13 each including a core section 11 and a shell section 12 covering the surface of the core section. Herein, the neighboring core-shell structure particles 13 are linearly linked to each other. The core section 11 is made of an alloy containing a first metal and a second metal. The shell section 12 is made of an alloy which contains the first metal and the second metal and which has a first metal-to-second metal content ratio different from that of the core section 11. In the magnetic structural body 10, which has such a structure, the core-shell structure particles 13, which are made of metal, are linearly linked together. Therefore, the magnetic structural body 10 has high magnetic permeability and higher mechanical strength.

The term "core-shell structure particles" as used in the present disclosure refers to those which have a structure that a shell section covers at least one portion of the surface of a core section, in which the core section and the shell section mainly contain a first metal and a second metal, and in which the core section and the shell section differ in first metal-to-second metal content ratio from each other. Core-shell structure particles in the present disclosure are not present alone and have a morphology that the core-shell structure particles are linked to each other.

In exemplified modes shown in FIGS. 1A to 1C, a plurality of the shell sections 12 continuously cover the surfaces of a plurality of the core sections 11. In other words, a plurality of the shell sections 12 are bonded together. Therefore, any substance (for example, an oxide or the like) different from the alloy making up the shell sections 12, any cavity, or the like is not present between the shell section 12 covering the surface of one of the core sections 11 and the shell section 12 covering the surface of the core section 11 adjoining the one of the core sections 11. The shell section 12 covering the surface of one of the core sections 11 and the shell section 12 covering the surface of the core section 11 adjoining the one of the core sections 11 are in surface contact with each other. The magnetic structural body 10 according to this embodiment has high mechanical strength because the shell sections 12 have such a continuous, integral structure. Therefore, the core-shell structure particles 13 are tightly linked to each other even under high-temperature conditions and can maintain such a wire form as shown in FIGS. 1A to 1C.

As is clear from the exemplified modes shown in FIGS. 1A to 1C, the magnetic structural body according to the present disclosure is such that the core-shell structure particles 13, which are made of metal, are linearly linked together. Since such a structure is used, in a case where a magnetic field is applied to the magnetic structural body in a longitudinal direction thereof, the demagnetizing field can be kept small and high magnetic permeability can be ensured. The term "linearly linked" as used herein may refer to a structure in which the major axis of one magnetic structural body 10 is not bent at ±30° or more over the whole of the magnetic structural body 10. The major axis of one magnetic structural body 10 is preferably not bent at ±20° or more, more preferably ±10° or more, and further more preferably ±5° or more. The magnetic structural body 10 may have a linear structure or a branched structure. From the viewpoint of enhancing the magnetic permeability, the magnetic structural body 10 preferably has the linear structure rather than the branched structure. In the magnetic structural body 10, at least three of the core-shell structure particles 13 may be linked together. In the magnetic structural body 10, the number of the core-shell structure particles 13 linked together is preferably at least ten and is, for example, at least 50.

The core-shell structure of the above-mentioned magnetic structural body can be confirmed in such a manner that after a cross section thereof is exposed using a focused ion beam (FIB), a mapping function of energy dispersive X-ray analysis (EDX) of a scanning transmission electron microscope (STEM) is used.

In the magnetic structural body according to the present disclosure, the core sections are preferably substantially spherical. When the core sections are substantially spherical, the magnetic structural body can be more readily obtained so as to have a wire form in which the core-shell structure particles are linearly linked together. The term "substantially spherical" as used herein can be expressed in terms of sphericity and refers to one with a sphericity of 50 or more. The sphericity is preferably 60 to 95 and may be, for example, 70 to 90 or 75 to 85. The sphericity may refer to one that is calculated in accordance with the following equation in such a manner that the lateral and longitudinal sizes are measured from two-dimensional images of particles photographed with a scanning electron microscope (SEM) and arbitrary ten of the particles are averaged:

$$\text{Sphericity}=\Sigma^{n}_{i=1}(\text{lateral size}/\text{longitudinal size})/n\times 100.$$

Setting the sphericity of the core sections to 50 or more enables the magnetic structural body to be more readily obtained such that the magnetic structural body has the wire form, in which the core-shell structure particles are linearly linked together, as described above. Setting the sphericity of the core sections 11 to 95 or less allows the core-shell structure particles 13 to have a flat shape as exemplified in FIG. 1(*b*), thereby allowing the contact area between the neighboring core-shell structure particles 13 to be larger.

In the magnetic structural body according to the present disclosure, the particle size of each core section is preferably 0.1 μm to 10 μm. When the particle size of the core section is 0.1 μm or more, a core-shell structure can be more effectively formed.

In the magnetic structural body according to the present disclosure, the neighboring core-shell structure particles are such that the shell sections in at least the individual core-shell structure particles are linked together. According to an embodiment, in the neighboring core-shell structure particles 13, the core sections 11 are linked to each other and the shell sections 12 are linked to each other as exemplified in FIG. 1(*c*). In other words, a plurality of the core sections 11 are linked to each other to form a core part and a plurality of the shell sections 12 covering the surface of the core part are linked to each other to form a shell part. Such a structure that a plurality of the core sections 11 are linked together allows the magnetic permeability and mechanical strength of the magnetic structural body 10 to be higher.

In the above embodiment, the contact area between the shell sections 12 in the contact plane between the neighboring core-shell structure particles 13 is preferably larger than the contact area between the core sections 11. In this case, the contact area between the shell section 12 covering the surface of one of the core sections 11 and the shell section 12 covering the surface of the core section 11 adjoining the one of the core sections 11 is larger than the contact area between the core sections 11 and therefore the mechanical strength of the magnetic structural body 10 is higher.

The core sections are made of the alloy containing the first metal and the second metal. The shell sections are made of the alloy which contains the first metal and the second metal and which has a first metal-to-second metal content ratio different from that of the core section. The alloy making up the core sections and the alloy making up the shell sections may contain other elements such as phosphorus and/or boron as described below and may further contain an inevitable impurity. The inevitable impurity is a trace component which may possibly be contained in raw materials of the magnetic structural body or which may possibly be trapped in a production step and is a component which is contained to such a degree that characteristics of the magnetic structural body are not affected.

The first metal has a standard redox potential higher than that of the second metal. In other words, the first metal is more likely to be reduced than the second metal. Therefore, the first metal precipitates prior to the second metal as described below in connection with a production method. As a result, in the core sections, the content of the first metal is higher than the content of the second metal. The first metal exhibits the catalytic effect of reducing the second metal to precipitate the second metal. The first metal is the magnetic metal. Therefore, the magnetic structural body according to an embodiment includes a wire-shaped core part in which a plurality of the core sections, which are made of a magnetic material, are linked to each other (that is, a wire-shaped magnetic core part). The first metal may be, for example, cobalt or nickel.

The second metal is more unlikely to be reduced than the first metal and is metal which is reduced by the catalytic effect of the first metal to precipitate. The second metal may be, for example, iron.

In a preferred embodiment, the first metal is cobalt or nickel and the second metal is iron. That is, the core sections and the shell sections are preferably made of an iron-cobalt alloy or an iron-nickel alloy. In this case, the saturation flux density of the magnetic structural body can be further increased.

The average concentration of the first metal in the core sections is preferably higher than the average concentration of the first metal in the shell sections. When the first metal is cobalt or nickel, the average concentration of cobalt or nickel in the core sections is preferably higher than the average concentration of cobalt or nickel in the shell sections. On the other hand, the average concentration of the second metal in the shell sections is preferably higher than the average concentration of the second metal in the core sections. Such a configuration enables the bond of the core-shell structure particles in the magnetic structural body to be strengthened.

The average concentration of each component contained in the core sections and the shell sections can be measured by STEM-EDX (scanning transmission electron microscope-energy dispersive X-ray spectroscope).

In an embodiment, the core sections and the shell sections are made of an amorphous alloy. The amorphous alloy has no crystallomagnetic anisotropy and is affected by magnetic shape anisotropy only. Therefore, in a case where the magnetic structural body according to this embodiment is used as a magnetic material for coil components, when the core sections and the shell sections are made of the amorphous alloy, the magnetic structural body may be placed in consideration of shape anisotropy only, thereby enabling the handleability of the magnetic structural body to be further enhanced.

The core sections and the shell sections may contain another element in addition to the first metal and the second metal. In an embodiment, the core-shell structure particles contain phosphorus. Herein, the core sections contain phosphorus and the average concentration of phosphorus in the core sections is higher than the average concentration of phosphorus in the shell sections. Phosphorus may be one derived from an oxidizing agent used in a step of producing the magnetic structural body. The core-shell structure particles contain boron in addition to or instead of phosphorus. Boron may be one derived from a reducing agent used in a step of producing the magnetic structural body. When the core sections and the shell sections contain, for example, iron and further contain phosphorus and/or boron, the core sections and the shell sections can be more successfully made from the amorphous alloy.

In an embodiment, the molar ratio of the first metal to second metal in the core sections is preferably from 1 to 3. When the molar ratio of the first metal to the second metal is within the above range, the magnetic structural body can be obtained so as to have higher saturation flux density. On the other hand, the molar ratio of the first metal to second metal in the shell sections is preferably from 1 to 2. In the shell sections, a region closer to the outer surface of each shell section has a higher first metal concentration.

The composition of the core sections and the composition of the shell sections are not particularly limited and may meet the above-mentioned conditions. The core sections and the shell sections preferably do not contain any noble metal, particularly gold (Au), palladium (Pd), platinum (Pt), and/or rhenium (Ru). When the core sections and the shell sections contain noble metals such as Au, Pd, Pt, and/or Ru, a core-shell structure like the magnetic structural body according to this embodiment cannot be formed as described below in connection with a method for producing the magnetic structural body.

The core sections and the shell sections are preferably made of the amorphous alloy. The amorphous alloy has no crystallomagnetic anisotropy and is affected by magnetic shape anisotropy only as described above. Therefore, in a case where the magnetic structural body according to this embodiment is used as a magnetic material for coil components, when the core sections and the shell sections are made of the amorphous alloy, the magnetic structural body may be placed in consideration of shape anisotropy only, thereby enabling the handleability of the magnetic structural body to be enhanced, which is preferable.

In an embodiment, the core-shell structure particles contain none of phosphorus and boron. In other words, the core-shell structure particles are made of a phosphorus-free component and a boron-free component. That is, the core-shell structure particles are made of components such as the first metal, the second metal, oxygen, nitrogen, carbon, and sodium only. Since the core-shell structure particles contain none of phosphorus and boron, magnetic characteristics (that is, saturation flux density and magnetic permeability) of the magnetic structural body can be more successfully prevented from deteriorating. However, the core-shell structure particles may contain phosphorus and boron in the form of inevitable impurities. The inevitable impurities are trace components which may possibly be contained in raw materials of the magnetic structural body or which may possibly be trapped in a producing step and are components which are contained to such a degree that characteristics of the magnetic structural body are not affected.

In an embodiment, the first metal in the magnetic structural body is preferably cobalt. In a case where the magnetic structural body is formed in, for example, a mode that the core-shell structure particles contain none of phosphorus and boron, the core sections are unlikely to become spherical; hence, the magnetic structural body linearly linked is not obtained in some cases. Even in this case, when the first metal used is cobalt, the core sections can be successfully obtained so as to be substantially spherical and the magnetic structural body linearly linked can be obtained. In this embodiment, the second metal is preferably iron.

In an embodiment, the molar ratio of the first metal to the second metal is preferably from 4 to 9. When the molar ratio thereof is 4 or more, the sphericity of the core sections can be increased, thereby enabling the magnetic structural body linearly linked to be obtained. When the molar ratio thereof is 9 or less, the shell sections can be sufficiently formed and the mechanical strength of the magnetic structural body can be further increased.

In an embodiment, the core sections preferably have a hexagonal close-packed structure phase. When the core sections have the hexagonal close-packed structure phase, the sphericity of the core sections can be increased, thereby enabling the magnetic structural body linearly linked to be obtained. From the viewpoint of the sphericity of the core-shell structure particles, the shell sections preferably have the hexagonal close-packed structure phase.

Next, a method for producing the magnetic structural body according to this embodiment is described below. A method described below is merely an example. The method for producing the magnetic structural body according to this embodiment is not limited to the method below.

In outline, the magnetic structural body is produced in such a manner that a metal salt-containing solution is added to a reducing solution (or the reducing solution is adjusted to the metal salt-containing solution) with a magnetic field applied thereto using a magnet or the like and the metal salt-containing solution and the reducing solution are subjected to reaction.

(Metal Salt-Containing Solution) The metal salt-containing solution contains a salt of the first metal, a salt of the second metal, and a solvent. Each of the first metal salt and the second metal salt may be at least one selected from the group consisting of sulfates, nitrates, and chlorides. The first metal salt and the second metal salt may be salts containing the same anion or salts containing different anions. When the first metal salt and the second metal salt are nitrates, nitrate ions are likely to decompose a reducing agent and therefore the growth rate of a particle making up each core section 11 tends to be low. As a result, the size of the core-shell structure particles tends to be large.

When the reducing solution used is basic, the metal salt-containing solution is an acidic solution.

The solvent contained in the metal salt-containing solution may be water or alcohol.

The metal salt-containing solution may further contain a chelating agent in addition to the first metal salt, the second metal salt, and the solvent. When the metal salt-containing solution contains the chelating agent, the first metal salt and the second metal salt are allowed to be stably present in the metal salt-containing solution. The chelating agent is preferably a salt stabilizing both the first metal salt and the second metal salt. Alternatively, the chelating agent is preferably a salt allowing the second metal salt to be more stably present than the first metal salt. This enables the second metal stabilized by the chelating agent to be slowly precipitated after large-size core sections which contain a larger amount of the first metal rather than the second metal (which are first metal-rich) are precipitated. As a result, the magnetic structural body can be obtained so as to have a core-shell structure.

(Reducing Solution)

The reducing solution contains a reducing agent and a solvent. The reducing agent may be at least one selected from the group consisting of sodium borohydride, dimethylamine borane, and hydrazine monohydrate. When the reducing agent contains boron (when the reducing agent is, for example, sodium borohydride), the magnetic structural body can incorporate boron. As a result, the magnetic structural body particles linked, which are made of the amorphous alloy, can be more successfully obtained. However, when the reducing agent contains no boron (when the reducing agent is, for example, hydrazine monohydrate), magnetic characteristics of the magnetic structural body can be more successfully prevented from deteriorating.

The solvent contained in the reducing solution may be water or alcohol.

The reducing solution may further contain an oxidizing agent in addition to the reducing agent and the solvent. The oxidizing agent may be, for example, sodium hypophosphite. When the reducing solution contains the oxidizing agent, the reducing power of the reducing agent can be adjusted.

In an embodiment in which the reducing agent contains boron, the molar ratio of the first metal to second metal in the metal salt-containing solution is preferably from 1 to 3. When the molar ratio of the first metal to the second metal is within the above range, the magnetic structural body can be obtained so as to have higher saturation flux density. Furthermore, a structure in which the core sections are linked to each other can be formed.

In an embodiment in which the reducing agent contains no boron, the first metal in the metal salt-containing solution is preferably cobalt. When the first metal used is cobalt, the core sections can be successfully obtained so as to be substantially spherical and the magnetic structural body linearly linked can be obtained. In this embodiment, the second metal is preferably iron.

The molar ratio of the first metal to second metal in the metal salt-containing solution is preferably from 4 to 9. When the molar ratio of the first metal to the second metal is within the above range, the magnetic structural body linearly linked can be formed and the magnetic structural body can be obtained so as to have higher magnetic permeability. Furthermore, the shell sections of the core-shell structure particles can be sufficiently formed and the mechanical strength of the magnetic structural body can be further enhanced.

Both the metal salt-containing solution and the reducing solution contain no noble metal, particularly none of gold (Au), palladium (Pd), platinum (Pt), and rhenium (Ru). Noble metals such as Au, Pd, Pt, and Ru exhibit a high catalytic effect on the reducing agent. Therefore, when the metal salt-containing solution and/or the reducing solution contains Au, Pd, Pt, and/or Ru, the first metal is precipitated together with the second metal and the core sections, which contain a large amount of the first metal (which is first metal-rich), cannot be preferentially precipitated. Hence, the magnetic structural body, which has the core-shell structure, cannot be obtained.

Figure 2A:
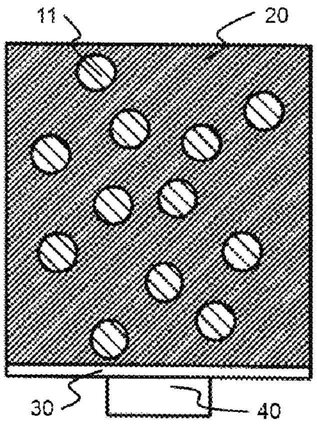
FIGS. 2A to 2C are schematic views showing a method for producing a magnetic structural body according to an embodiment of the present disclosure.
Figure 2B:
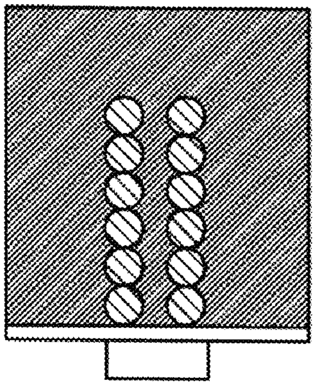
Figure 2C:
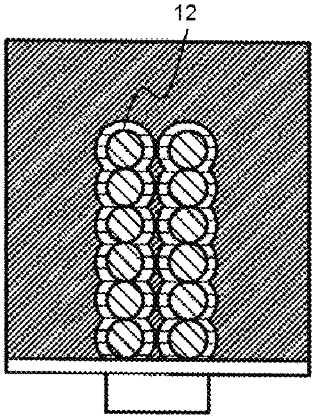

The formation of the magnetic structural body according to the present disclosure is described using an illustrated mode shown in FIGS. 2A-2C. First, the reducing solution is added to the above-mentioned metal salt-containing solution in a beaker 30 with a magnetic field applied thereto using a magnet 40, whereby a mixed solution 20 is prepared. In the mixed solution 20, which is prepared by adding the reducing solution to the metal salt-containing solution, the first metal, which has a standard redox potential higher than that of the second metal, is preferentially precipitated in a solution, whereby a plurality of the core sections 11 are formed (refer to FIG. 2A). After the core sections 11 are formed, a structure in which a plurality of the core sections 11, which are made of an alloy containing the first metal, which is the magnetic metal, are linearly linked to each other can be formed (refer to FIG. 2B). Since the second metal has a standard redox potential lower than that of the first metal, the second metal is precipitated after the formation of the core sections 11 to form the shell sections 12, which cover the surfaces of the core sections (refer to FIG. 2C). In this operation, the first metal acts as a catalyst that reduces the second metal to precipitate the second metal.

The reaction of the metal salt-containing solution with the reducing agent is preferably carried out at 50° C. to 80° C. and more preferably about 60° C.

The magnetic structural body is produced as described above, has high mechanical strength, and is such that the core-shell structure particles are tightly linked together under high-temperature conditions and a wire form can be maintained.

Example 1

A magnetic structural body of Example 1 was prepared by a procedure described below. First, iron(II) sulfate heptahydrate, cobalt(II) sulfate heptahydrate, and trisodium citrate dihydrate were weighed so as to give a composition shown in Table 1 and were used to prepare 50 mL of a metal salt-containing solution. A solvent used in the metal salt-containing solution was water. Furthermore, sodium borohydride which was a reducing agent, sodium hypophosphite, and sodium hydroxide for pH adjustment were weighed so as to give a composition shown in Table 2 and were used to prepare 50 mL of a reducing solution. A solvent used in the reducing solution was water. A φ 15 mm×10 mm samarium-cobalt magnet was placed into a water bath maintained at 60° C. and a 200 mL beaker containing 50 mL of the above-mentioned metal salt-containing solution was placed thereon. The above-mentioned reducing solution was poured into a 100 mL beaker and was maintained at 60° C. The reducing solution was added to the metal salt-containing solution at a flow rate of 2 mL/min using a liquid transfer pump.

TABLE 1

| Substance name | Chemical formula | Concentration/M |
|---|---|---|
| Iron sulfate | $FeSO_4$ | 0.015 |
| Cobalt sulfate | $CoSO_4$ | 0.015 |
| Trisodium citrate | $Na_3(C_3H_5O(COO)_3)$ | 0.090 |

TABLE 2

| Substance name | Chemical formula | Concentration/M |
|---|---|---|
| Sodium hydroxide | NaOH | 2.00 |
| Sodium borohydride | $NaBH_4$ | 0.53 |
| Sodium hypophosphite | $NaH_2PO_2$ | 0.50 |

After all the reducing solution was added, an obtained solution was maintained at 60° C. for 30 minutes. A precipitate attracted to the magnet on the bottom of the beaker was collected and was rinsed with pure water four times, whereby the remaining reducing agent and the like were removed. The magnetic structural body of Example 1 was obtained as described above.

Figure 3:
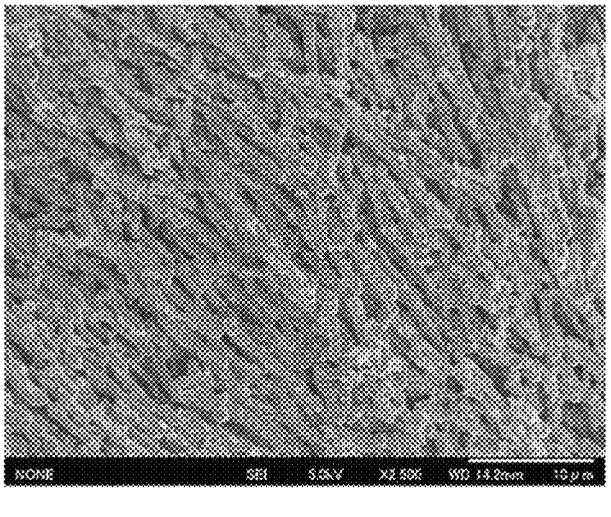
FIG. 3 is a SEM photograph of Example 1.
Figure 4:
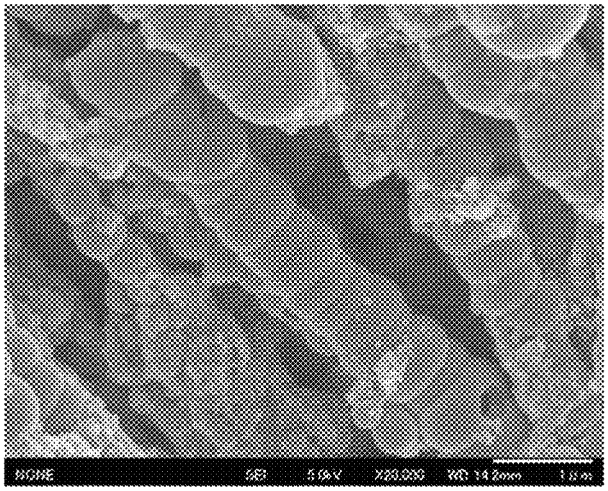
FIG. 4 is a SEM photograph of Example 1.

FIGS. 3 and 4 show the appearance of the magnetic structural body observed with a scanning electron microscope (SEM). SEM observation confirmed that core-shell structure particles with a diameter of about 1 μm were linearly linked together to form the magnetic structural body, which was wire-shaped. The core-shell structure particles had a shape that both ends of a spherical or substantially spherical particle were cut by parallel or substantially parallel two planes. The neighboring core-shell structure particles shared a cross section to form a shape that particles were linked together. The magnetic structural body, which was wire-shaped, was subjected to focused ion beam (FIB) processing, followed by analyzing the composition of a cross section of the magnetic structural body by STEM-EDX analysis. Results are shown in FIG. 5.

Figure 5:
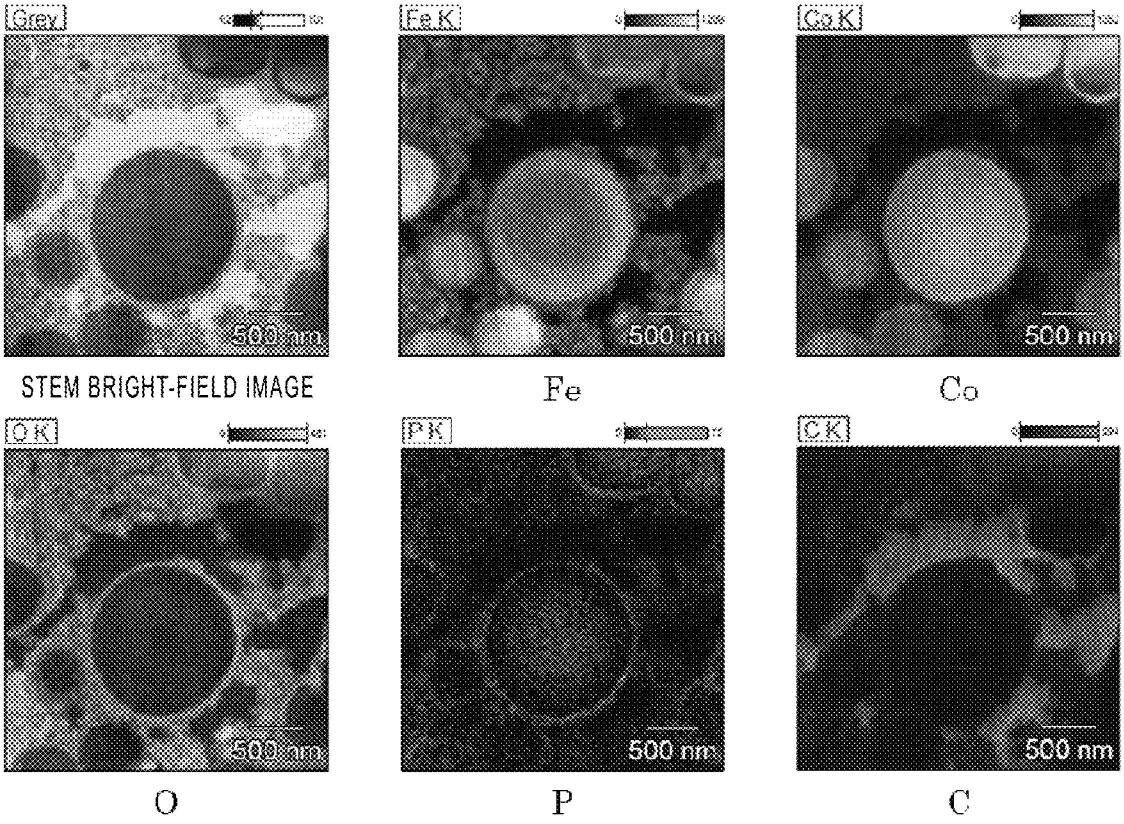
FIG. 5 is STEM-EDX analysis results of Example 1.

FIG. 5 shows composition analysis results of a cross section substantially perpendicular to an axis (hereinafter referred to as the "wire axis") substantially parallel to a direction in which the core-shell structure particles are linked together. As is clear from FIG. 5, core sections which contain a relatively large amount of a first metal (which are cobalt-rich) are present inside the magnetic structural body and each of shell sections in which the content of the first metal is relatively small (which are cobalt-poor) covers the periphery of a corresponding one of the core sections. This is probably because, since cobalt is more likely to be reduced than iron by the reducing agent, a cobalt-rich component was first precipitated to form the core sections, the decomposition of the reducing agent was subsequently promoted by the catalytic effect of precipitated cobalt, and the shell sections, which are cobalt-poor (that is, iron-rich), were precipitated around the core sections.

Figure 6:
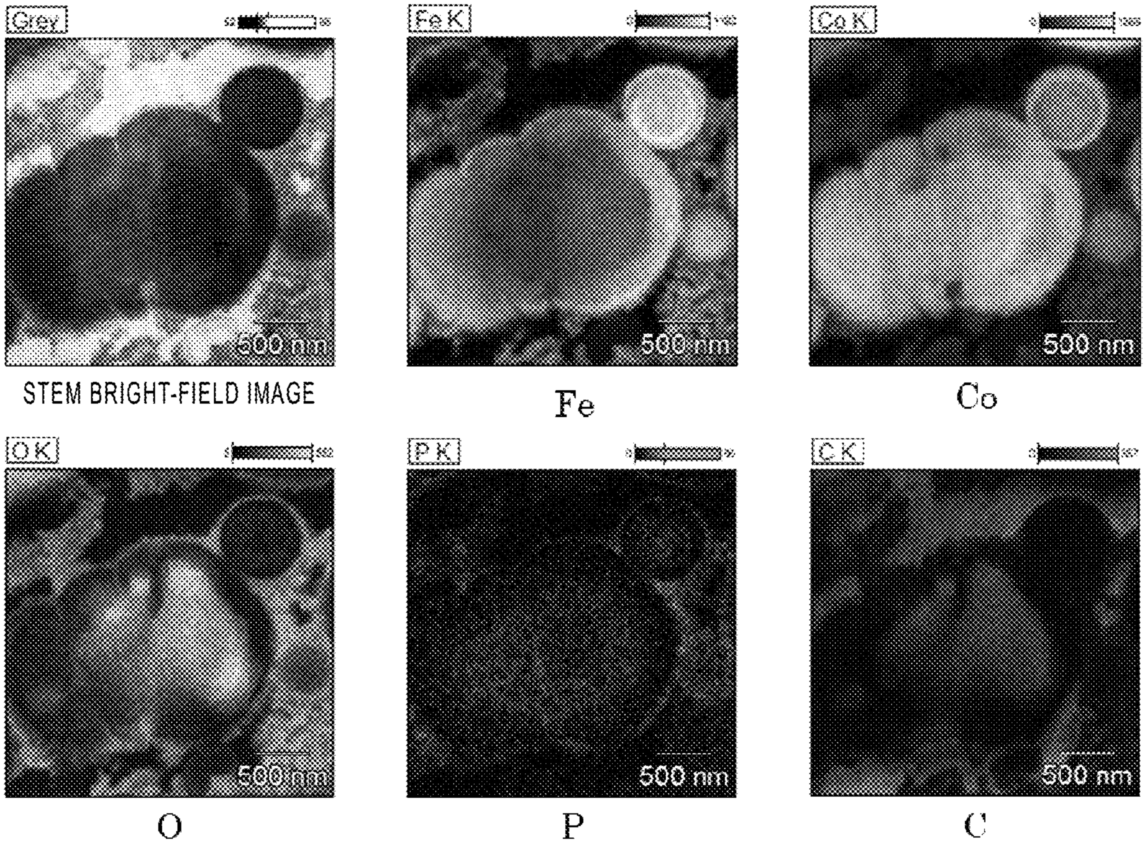
FIG. 6 is STEM-EDX analysis results of Example 1.

FIG. 6 shows composition analysis results of a cross section substantially parallel to the wire axis of the magnetic structural body. From FIG. 6, it could be confirmed that the core sections, which were cobalt-rich, were present in the magnetic structural body and each of the shell sections, which were cobalt-poor, covered the surface of a corresponding one of the core sections. In the neighboring core-shell structure particles, it could be confirmed that the core sections were linked to each other and the shell sections were linked to each other. It could be confirmed that the contact area between the shell sections in the contact plane between the neighboring core-shell structure particles was larger than the contact area between the core sections. Furthermore, it became clear that any cavity or any substance different from the composition of the shell sections was not present between the neighboring shell sections and the shell sections had a continuous, integral structure.

Figure 7:
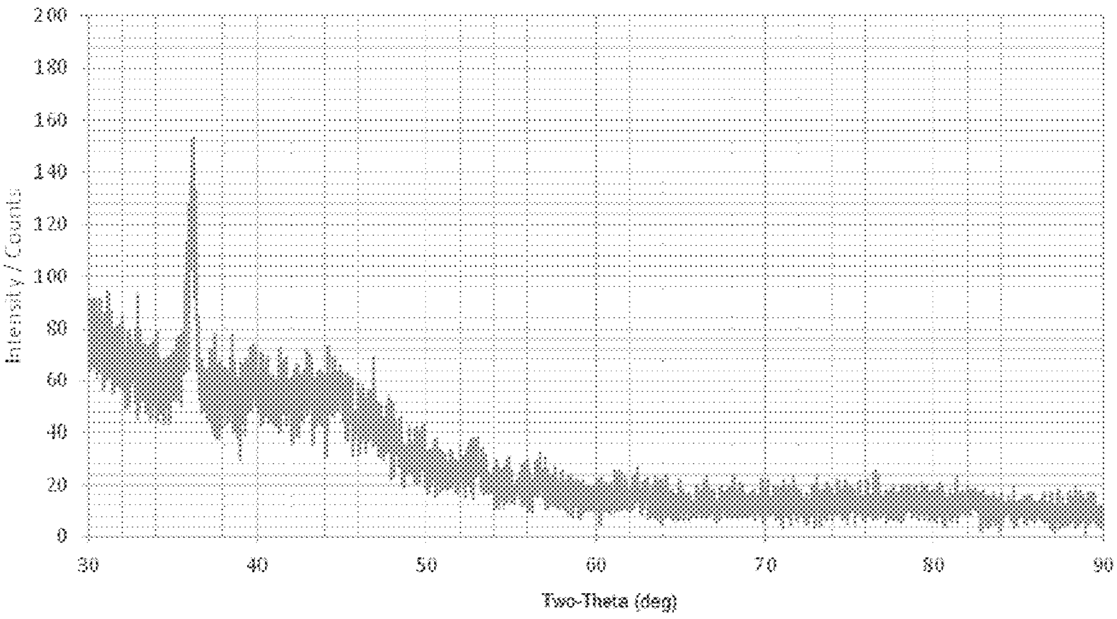
FIG. 7 is XRD analysis results of the magnetic structural body of Example 1.

FIG. 7 shows XRD analysis results of the core-shell structure particles in Example 1. No clear crystal peak was present as shown in FIG. 7 and it became clear that the core-shell structure particles were made of an amorphous alloy. Incidentally, a peak at about 36 (2θ) in FIG. 7 is a diffraction peak due to a sample bag and does not show any crystal peak of the core-shell structure particles.

Wires obtained in Example 1 are such that the core-shell structure particles are made of an iron-cobalt alloy and are linearly linked together. Each of the core-shell structure particles has a shape that both ends of a spherical or substantially spherical particle are cut by parallel or substantially parallel two planes. The neighboring core-shell structure particles share a cross section to form a shape that a plurality of the core-shell structure particles are linked together. The surface of each of the core sections, which are relatively cobalt-rich, is covered by a corresponding one of the shell sections, which are relatively cobalt-poor. The neighboring shell sections are in contact with each other at an area larger than that between the cores, which are placed therein. In addition, any cavity or any substance different from the composition of the shell sections is not present between the neighboring shell sections. This allows the shell sections to be continuously integrated in one of the wires, thereby obtaining an effect that the strength of the wires is high. Since the shell sections are made of the iron-cobalt alloy, an effect that the shell sections can maintain a wire shape up to a relatively high temperature unlike polymers with a low heatproof temperature is obtained.

Example 2

A magnetic structural body of Example 2 was prepared by a procedure described below. Iron(II) sulfate heptahydrate, nickel(II) sulfate hexahydrate, and trisodium citrate dihydrate were weighed so as to give a composition shown in Table 3 and were used to prepare 50 mL of a metal salt-containing solution. A solvent used in the metal salt-containing solution was water. Furthermore, sodium borohydride which was a reducing agent, sodium hypophosphite, and sodium hydroxide for pH adjustment were weighed so as to give a composition shown in Table 4 and were used to prepare 50 mL of a reducing solution. A solvent used in the reducing solution was water. A φ 15 mm×10 mm samarium-cobalt magnet was placed into a water bath maintained at 60° C. and a 200 mL beaker containing 50 mL of the metal salt-containing solution was placed thereon. The reducing solution was poured into a 100 mL beaker and was maintained at 60° C. The reducing solution was added to the metal salt-containing solution at a flow rate of 2 mL/min using a liquid transfer pump. All the reducing solution was added and was then maintained at 60° C. for 30 minutes. A precipitate attracted to the magnet on the bottom of the beaker was collected and was rinsed with pure water four times, whereby the remaining reducing agent and the like were removed.

TABLE 3

| Substance name | Chemical formula | Concentration/M |
|---|---|---|
| Iron sulfate | $FeSO_4$ | 0.015 |
| Nickel sulfate | $NiSO_4$ | 0.015 |
| Trisodium citrate | $Na_3(C_3H_5O(COO)_3)$ | 0.090 |

TABLE 4

| Substance name | Chemical formula | Concentration/M |
|---|---|---|
| Sodium hydroxide | NaOH | 2.00 |
| Sodium borohydride | $NaBH_4$ | 0.53 |
| Sodium hypophosphite | $NaH_2PO_2$ | 0.50 |

Figure 8:
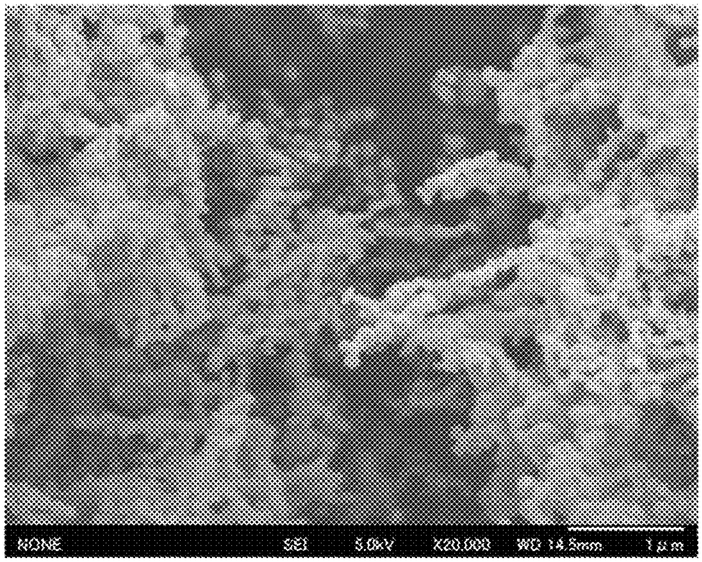
FIG. 8 is a SEM photograph of a magnetic structural body of Example 2.

FIG. 8 shows the appearance of the precipitate observed with a SEM. It was confirmed that core-shell structure particles with a diameter of about 100 nm to 200 nm were linearly arranged to form the magnetic structural body, which was wire-shaped. The particles had a shape that a spherical or substantially spherical shape was cut by parallel or substantially parallel two planes. The neighboring particles shared a cross section to form a shape that particles were linked together. Wires obtained in Example 2, as well as the wires obtained in Example 1, had a core-shell structure composed of core sections which contained a relatively large amount of a first metal (which were nickel-rich) and shell sections in which the content of the first metal was relatively low (which were nickel-poor).

The wires obtained in Example 2 are such that the core-shell structure particles are made of an iron-nickel alloy and are linearly linked together. The particles have a shape that a spherical or substantially spherical shape is cut by parallel or substantially parallel two planes. The neighboring particles share a cross section to form a shape that particles are linked together. One of the wires is continuously integral and an effect that the strength of the wires is high is obtained. An effect that a wire shape can be maintained up to a relatively high temperature unlike polymers with a low heatproof temperature is obtained.

Example 3

Figure 9:
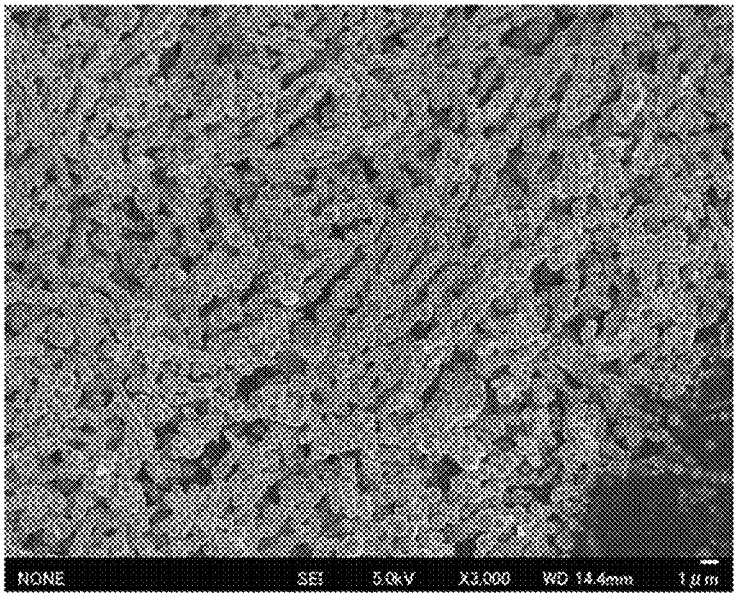
FIG. 9 is a SEM photograph of a magnetic structural body of Example 3.

Synthesis was performed under the same conditions as those used in Example 1 except that the types of metal salts were changed from iron(II) sulfate heptahydrate and cobalt (II) sulfate heptahydrate in Example 1 to iron(II) chloride tetrahydrate and cobalt(II) chloride hexahydrate, respectively. FIG. 9 shows the appearance of a precipitate observed with a SEM. It was confirmed that core-shell structure particles with an average diameter of about 1 μm were linearly arranged to form a wire-shaped magnetic structural body. The particles had a shape that a spherical or substantially spherical shape was cut by parallel or substantially parallel two planes. The neighboring particles shared a cross section to form a shape that particles were linked together. Wires obtained in Example 3, as well as the wires obtained in Example 1, had a core-shell structure composed of core sections which contained a relatively large amount of a first metal (which were cobalt-rich) and shell sections in which the content of the first metal was relatively low (which were cobalt-poor).

The wires obtained in Example 3 are such that the core-shell structure particles are made of an iron-cobalt alloy and are linearly linked together. The particles have a shape that a spherical or substantially spherical shape is cut by parallel or substantially parallel two planes. The neighboring particles share a cross section to form a shape that particles are linked together. One of the wires is continuously integral and an effect that the strength of the wires is high is obtained. An effect that a wire shape can be maintained up to a relatively high temperature unlike polymers with a low heatproof temperature is obtained.

Example 4

Figure 10:
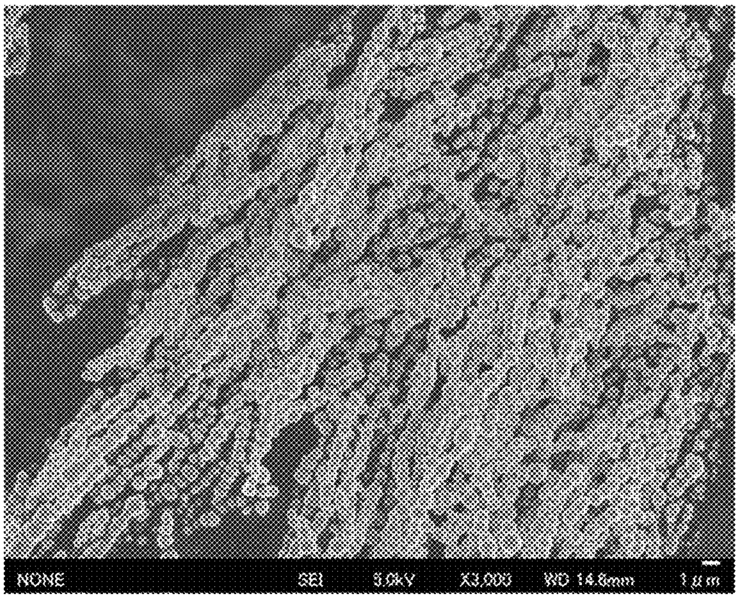
FIG. 10 is a SEM photograph of a magnetic structural body of Example 4.

Synthesis was performed under the same conditions as those used in Example 1 except that the types of metal salts were changed from iron(II) sulfate heptahydrate and cobalt (II) sulfate heptahydrate in Example 1 to iron(II) acetate and cobalt(II) acetate tetrahydrate, respectively. FIG. 10 shows the appearance of a precipitate observed with a SEM. It was confirmed that core-shell structure particles with an average diameter of about 1 μm were linearly arranged to form a wire-shaped magnetic structural body. The particles had a shape that a spherical or substantially spherical shape was cut by parallel or substantially parallel two planes. The neighboring particles shared a cross section to form a shape that particles were linked together. Wires obtained in Example 4, as well as the wires obtained in Example 1, had a core-shell structure composed of core sections which contained a relatively large amount of a first metal (which were cobalt-rich) and shell sections in which the content of the first metal was relatively low (which were cobalt-poor).

The wires obtained in Example 4 are such that the core-shell structure particles are made of an iron-cobalt alloy and are linearly linked together. The particles have a shape that a spherical or substantially spherical shape is cut by parallel or substantially parallel two planes. The neighboring particles share a cross section to form a shape that particles are linked together. One of the wires is continuously integral and an effect that the strength of the wires is high is obtained. An effect that a wire shape can be maintained up to a relatively high temperature unlike polymers with a low heatproof temperature is obtained.

Example 5

A magnetic structural body of Example 5 was prepared by a procedure described below. Iron(II) acetate and cobalt(II) acetate tetrahydrate were weighed so as to give a composition shown in Table 5 and were used to prepare 50 mL of a metal salt-containing solution. A solvent used in the metal salt-containing solution was ethylene glycol. Furthermore, hydrazine monohydrate which was a reducing agent and sodium hydroxide for pH adjustment were weighed so as to give a composition shown in Table 6 and were used to prepare 50 mL of a reducing solution. A solvent used in the reducing solution was ethylene glycol. A φ 15 mm×10 mm samarium-cobalt magnet was placed into a water bath maintained at 60° C. and a 200 mL beaker containing 50 mL of the metal salt-containing solution was placed thereon. The above-mentioned reducing solution was poured into a 100 mL beaker and was maintained at 60° C. The reducing solution was added to the metal salt-containing solution at a flow rate of 2 mL/min using a liquid transfer pump.

TABLE 5

| Substance name | Chemical formula | Concentration/M |
|---|---|---|
| Iron acetate | $Fe(CH_3CO_2)_2$ | 0.016 |
| Cobalt acetate | $Co(CH_3CO_2)_2$ | 0.064 |

TABLE 6

| Substance name | Chemical formula | Concentration/M |
|---|---|---|
| Sodium hydroxide | NaOH | 3.330 |
| Hydrazine | $N_2H_4$ | 6.750 |

All the reducing solution was added and was then maintained at 60° C. for 30 minutes. A precipitate attracted to the magnet on the bottom of the beaker was collected and was rinsed with pure water four times, whereby the remaining reducing agent and the like were removed. The magnetic structural body of Example 5 was obtained as described above.

Figure 11:
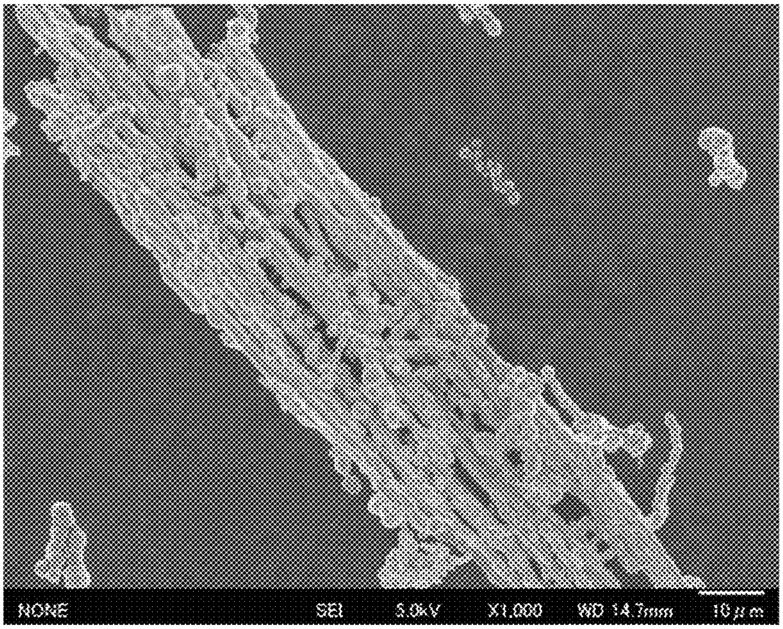
FIG. 11 is a SEM photograph of a magnetic structural body of Example 5.

FIG. 11 shows the appearance of the precipitate observed with a SEM. It was confirmed that spherical core-shell structure particles with a diameter of about 1 μm were linearly linked together to form the magnetic structural body, which was wire-shaped. The particles had a shape that a spherical or substantially spherical shape was cut by parallel or substantially parallel two planes. The neighboring core-shell structure particles shared a cross section to form a shape that particles were linked together.

Figure 12:
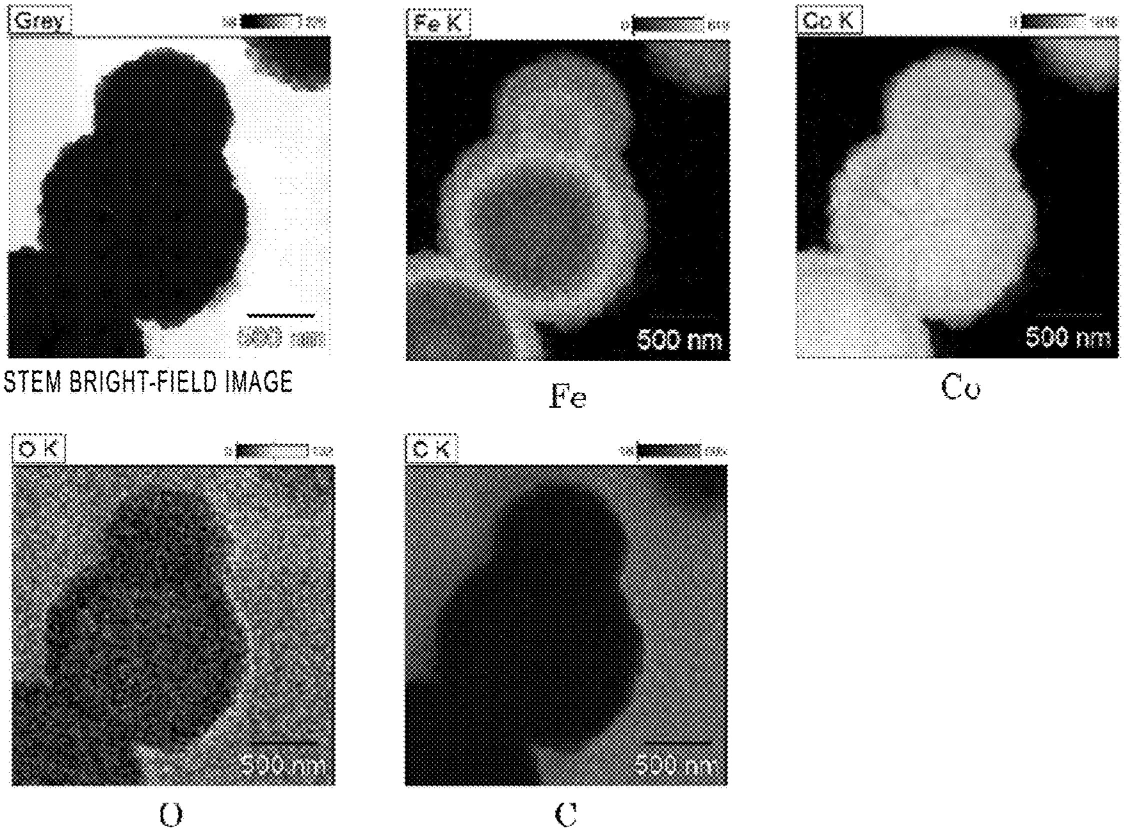
FIG. 12 is STEM-EDX analysis results of the magnetic structural body of Example 5.

The obtained magnetic structural body, which was wire-shaped, was subjected to FIB processing, followed by analyzing the composition of a cross section of the magnetic structural body, which was wire-shaped, by STEM/EDX analysis. Results are shown in FIG. 12. As shown in FIG. 12, it is clear that a core section which is relatively cobalt-rich is present inside each of the core-shell structure particles and a shell section which is relatively cobalt-poor covers the periphery of the core section. This is probably because, since cobalt is more likely to be reduced than iron by the reducing agent, cobalt-rich particles are first precipitated to form cores, the decomposition of the reducing agent is promoted by the catalytic effect of subsequently precipitated cobalt, and shells which are cobalt-poor (that is, iron-rich) are precipitated around the cores. In this example, it became clear that no boron or phosphorus was contained in the particles because the reducing agent used was not sodium borohydride or sodium hypophosphite. Therefore, the magnetic structural body of Example 5 exhibits good magnetic characteristics such as saturation flux density and magnetic permeability.

Figure 13:
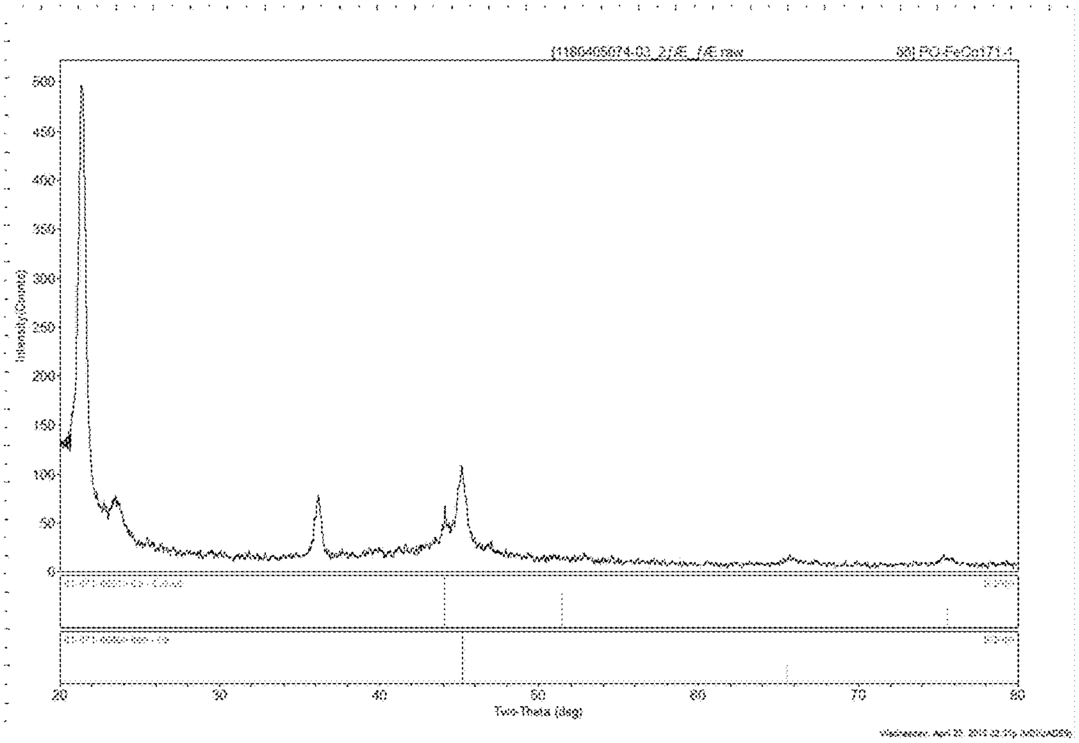
FIG. 13 is XRD analysis results of the magnetic structural body of Example 5.

FIG. 13 shows XRD analysis results of the core-shell structure particles in Example 5. It became clear that the core-shell structure particles had a hexagonal close-packed structure as shown in FIG. 13. Incidentally, a peak at about 44 (2θ) and a peak at about 76 (2θ) in FIG. 13 are peaks showing a hexagonal close-packed structure phase.

Example 6

Synthesis was performed under the same conditions as those used in Example 5 except that the molar concentration of each metal salt in the metal salt-containing solution used in Example 5 was adjusted so as to give a composition shown in Table 7.

TABLE 7

| Substance name | Chemical formula | Concentration/M |
|---|---|---|
| Iron acetate | $Fe(CH_3CO_2)_2$ | 0.008 |
| Cobalt acetate | $Co(CH_3CO_2)_2$ | 0.072 |

Figure 14:
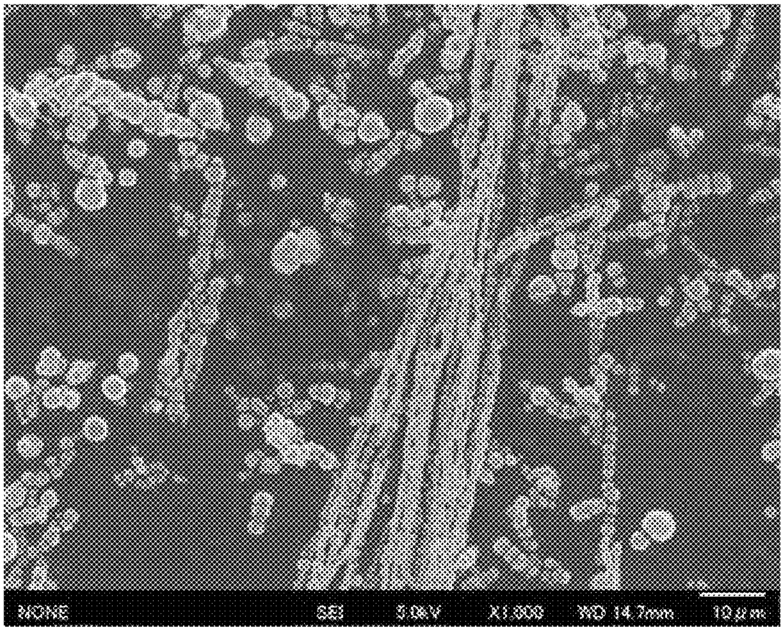
FIG. 14 is a SEM photograph of a magnetic structural body of Example 6.

FIG. 14 shows the appearance of a precipitate observed with a SEM. It was confirmed that spherical particles with a diameter of about 1 μm were linearly arranged to form a wire-shaped magnetic structural body. The core-shell structure particles had a shape that a spherical or substantially spherical shape was cut by parallel or substantially parallel two planes. The neighboring core-shell structure particles shared a cross section to form a shape that particles were linked together.

The present disclosure includes modes below and is not limited to the modes.

(Mode 1)

A magnetic structural body contains core-shell structure particles each including a core section and a shell section covering the surface of the core section.

The core section is made of an alloy containing a first metal and a second metal.

The shell section is made of an alloy which contains the first metal and the second metal and which has a first metal-to-second metal content ratio different from that of the core section.

The first metal is a magnetic metal and has a standard redox potential higher than that of the second metal.

The neighboring core-shell structure particles are linearly linked to each other.

(Mode 2)

In the magnetic structural body specified in Mode 1, the core section is substantially spherical.

(Mode 3)

In the magnetic structural body specified in Mode 1 or 2, in the neighboring core-shell structure particles, the core sections of each of the core-shell structure particles are linked to each other and the shell sections are linked to each other.

(Mode 4)

In the magnetic structural body specified in Mode 3, the contact area between the shell sections in the contact plane between the neighboring core-shell structure particles is larger than the contact area between the core sections.

(Mode 5)

In the magnetic structural body specified in any one of Modes 1 to 4, the average concentration of the first metal in the core sections is higher than the average concentration of the first metal in the shell sections.

(Mode 6)

In the magnetic structural body specified in any one of Modes 1 to 5, the average concentration of the second metal in the shell sections is higher than the average concentration of the second metal in the core sections.

(Mode 7)

In the magnetic structural body specified in any one of Modes 1 to 6, the core sections and the shell sections are made of an amorphous alloy.

(Mode 8)

In the magnetic structural body specified in any one of Modes 1 to 7, the first metal is cobalt or nickel and the second metal is iron.

(Mode 9)

In the magnetic structural body specified in any one of Modes 1 to 8, the core-shell structure particles contain phosphorus and the average concentration of phosphorus in the core sections is higher than the average concentration of phosphorus in the shell sections.

(Mode 10)

In the magnetic structural body specified in any one of Modes 1 to 9, the core-shell structure particles contain boron.

(Mode 11)

In the magnetic structural body specified in any one of Modes 1 to 10, the molar ratio of the first metal to second metal in the core sections is from 1 to 3.

(Mode 12)

In the magnetic structural body specified in any one of Modes 1 to 8, the core-shell structure particles contain none of phosphorus and boron.

(Mode 13)

In the magnetic structural body specified in any one of Modes 1 to 8 and 12, the first metal is cobalt and the second metal is iron.

(Mode 14)

In the magnetic structural body specified in any one of Modes 1 to 8, 12, and 13, the molar ratio of cobalt to iron in the magnetic structural body is from 4 to 9.

(Mode 15)

In the magnetic structural body specified in any one of Modes 1 to 8 and 12 to 14, the core sections have a hexagonal close-packed structure phase.

A magnetic structural body according to the present disclosure can be widely used as a magnetic material making up an electronic component such as an inductor in various applications.

What is claimed is:

1. A magnetic structural body comprising:

core-shell structure particles, each including a core section and a shell section covering the surface of the core section, wherein the core section is made of an alloy containing a first metal and a second metal, the shell section is made of an alloy which contains the first metal and the second metal and which has a first metal-to-second metal content ratio different from that of the core section, the first metal is a magnetic metal and has a standard redox potential higher than that of the second metal, and the neighboring core-shell structure particles are linearly linked to each other.

2. The magnetic structural body according to claim 1, wherein the core section is substantially spherical.

3. The magnetic structural body according to claim 1, wherein in the neighboring core-shell structure particles, the core sections of each of the core-shell structure particles are linked to each other and the shell sections are linked to each other.

4. The magnetic structural body according to claim 3, wherein the contact area between the shell sections in the contact plane between the neighboring core-shell structure particles is larger than the contact area between the core sections.

5. The magnetic structural body according to claim 1, wherein an average concentration of the first metal in the core sections is higher than an average concentration of the first metal in the shell sections.

6. The magnetic structural body according to claim 1, wherein an average concentration of the second metal in the shell sections is higher than an average concentration of the second metal in the core sections.

7. The magnetic structural body according to claim 1, wherein the core sections and the shell sections are made of an amorphous alloy.

8. The magnetic structural body according to claim 1, wherein the first metal is cobalt or nickel and the second metal is iron.

9. The magnetic structural body according to claim 1, wherein the core-shell structure particles contain phosphorus and an average concentration of phosphorus in the core sections is higher than an average concentration of phosphorus in the shell sections.

10. The magnetic structural body according to claim 1, wherein the core-shell structure particles contain boron.

11. The magnetic structural body according to claim 1, wherein a molar ratio of the first metal to second metal in the core sections is from 1 to 3.

12. The magnetic structural body according to claim 1, wherein the core-shell structure particles contain none of phosphorus and boron.

13. The magnetic structural body according to claim 1, wherein the first metal is cobalt and the second metal is iron.

14. The magnetic structural body according to claim 1, wherein a molar ratio of the first metal to second metal in the magnetic structural body is from 4 to 9.

15. The magnetic structural body according to claim 1, wherein the core sections have a hexagonal close-packed structure phase.

16. The magnetic structural body according to claim 2, wherein in the neighboring core-shell structure particles, the core sections of each of the core-shell structure particles are linked to each other and the shell sections are linked to each other.

17. The magnetic structural body according to claim 2, wherein an average concentration of the first metal in the core sections is higher than an average concentration of the first metal in the shell sections.

18. The magnetic structural body according to claim 2, wherein an average concentration of the second metal in the shell sections is higher than an average concentration of the second metal in the core sections.

19. The magnetic structural body according to claim 2, wherein the core sections and the shell sections are made of an amorphous alloy.

20. The magnetic structural body according to claim 2, wherein the first metal is cobalt or nickel and the second metal is iron.

* * * * *